United States Patent
Sano

(10) Patent No.: US 7,274,540 B2
(45) Date of Patent: Sep. 25, 2007

(54) MAGNETORESISTIVE HEAD HAVING AN MR ELEMENT BETWEEN A PAIR OF SHIELDS AND INCLUDING FIRST AND SECOND UNDERLAYERS

(75) Inventor: Masashi Sano, Tokyo (JP)

(73) Assignee: TDK Corporation, Tokyo (JP)

( * ) Notice: Subject to any disclaimer, the term of this patent is extended or adjusted under 35 U.S.C. 154(b) by 389 days.

(21) Appl. No.: 10/967,359

(22) Filed: Oct. 19, 2004

(65) Prior Publication Data

US 2005/0094320 A1 May 5, 2005

(30) Foreign Application Priority Data

Nov. 4, 2003 (JP) ............................. 2003-374238

(51) Int. Cl.
*G11B 5/39* (2006.01)
(52) U.S. Cl. ..................................... 360/319; 360/321
(58) Field of Classification Search ................ 360/319, 360/324.1, 324.2, 321
See application file for complete search history.

(56) References Cited

U.S. PATENT DOCUMENTS 5,668,688 A   9/1997  Dykes et al.
6,781,801 B2 * 8/2004  Heinonen et al. ........ 360/324.2
2003/0035255 A1   2/2003  Hasegawa et al.
2003/0039080 A1   2/2003  Kagami et al.
2003/0197987 A1 * 10/2003  Saito ..................... 360/324.12
2004/0017639 A1 *  1/2004  Deak ........................... 360/290
2004/0042128 A1 *  3/2004  Slaughter et al. ........ 360/324.2

FOREIGN PATENT DOCUMENTS

JP   A 11-509956    8/1999
JP   A 2002-359416  12/2002
JP   A 2003-60262   2/2003
JP   A 2003-101102  4/2003

* cited by examiner

Primary Examiner—Jefferson Evans
(74) Attorney, Agent, or Firm—Oliff & Berridge, PLC

(57) ABSTRACT

A magnetoresistive device includes a first shield layer and a second shield layer disposed at a specific distance from each other, an MR element disposed between the first and second shield layer, and an underlying layer disposed between the first shield layer and the MR element. The underlying layer, the MR element and the second shield layer are stacked on the first shield layer. The underlying layer includes a first layer having a bottom surface that is in contact with the first shield layer, and a second layer having a bottom surface that is in contact with a top surface of the first layer and a top surface that is adjacent to the MR element with a conductive layer disposed in between. The first layer is made of a material including at least one of Ta, Ti, W, HF and Y. The second layer is an alloy including Ni and Cr.

9 Claims, 9 Drawing Sheets

MAGNETORESISTIVE HEAD HAVING AN MR ELEMENT BETWEEN A PAIR OF SHIELDS AND INCLUDING FIRST AND SECOND UNDERLAYERS

BACKGROUND OF THE INVENTION

1. Field of the Invention

The present invention relates to a magnetoresistive device comprising a magnetoresistive element for reading magnetic signals and a method of manufacturing such a magnetoresistive device, and to a thin-film magnetic head, a head gimbal assembly and a hard disk drive each including a magnetoresistive device.

2. Description of the Related Art

Performance improvements in thin-film magnetic heads have been sought as a real recording density of hard disk drives has increased. Such thin-film magnetic heads include composite thin-film magnetic heads that have been widely used. A composite head is made of a layered structure including a write (recording) head having an induction-type electromagnetic transducer for writing and a read (reproducing) head having a magnetoresistive (MR) element for reading.

MR elements include: anisotropic magnetoresistive (AMR) elements utilizing an anisotropic magnetoresistive effect; giant magnetoresistive (GMR) elements utilizing a giant magnetoresistive effect; and tunnel magnetoresistive (TMR) elements utilizing a tunnel magnetoresistive effect.

High sensitivity and high output capability are required as characteristics of a read head. GMR heads incorporating spin-valve GMR elements have been mass-produced as read heads that satisfy such requirements. In this type of GMR head the GMR element is inserted between a bottom shield layer and a top shield layer. Each of the top and bottom shield layers is made of a magnetic metal material such as NiFe or FeAlSi.

Conventional GMR heads have a structure in which a current used for detecting magnetic signals (that is hereinafter called a sense current) is fed in the direction parallel to a plane of each film making up the GMR element. Such a structure is called a current-in-plane (CIP) structure. In the GMR head having the CIP structure, the GMR element is insulated from each of the top and bottom shield layers by an insulating film. As a result, there arises a problem that, if the space between the top and bottom shield layers is reduced to enhance the linear recording density of the GMR head having the CIP structure, the above-mentioned insulating film is made thin and it is difficult to maintain the insulation between the GMR element and each of the shield layers.

The heads proposed to solve such a problem are GMR heads having a structure in which a sense current is fed in the direction perpendicular to a plane of each film making up the GMR element. Such a structure is called a current-perpendicular-to-plane (CPP) structure. It is not necessary to insulate the GMR element from each of the shield layers for the GMR head having the CPP structure. Therefore, the GMR head having the CPP structure is free from the above-mentioned problem. A TMR head incorporating a TMR element has the CPP structure, too.

The characteristics of an MR element are affected by the crystallinity and orientability of the films making up the MR element. Therefore, an underlying layer is often provided under the MR element for the purpose of improving the crystallinity and orientability of the films making up the MR element. When such an underlying layer is provided in a head having the CPP structure, the films making up the MR element are formed on the underlying layer provided on the bottom shield layer made of a magnetic metal material.

GMR heads having the CPP structure are disclosed in the Published Japanese Translation of PCT International Publication for Patent Application Heisei 11-509956 (1999) (hereinafter referred to as "JP-A-H11-509956") and the Published Unexamined Japanese Patent Application 2003-60262 (hereinafter referred to as "JP-A-2003-60262"). In the GMR head disclosed in JP-A-H11-509956, a conductor layer is formed directly on the bottom shield layer or formed on an insulating gap layer that is provided on the bottom shield layer, and a spin-valve GMR element is formed on the conductor layer. The conductor layer is made of a material including any of Rh, Al, Au, Ta and Ag, or an alloy of these elements.

In the GMR head disclosed in JP-A-2003-60262, a spin-valve GMR element is formed on a bottom metal layer that is provided on the bottom shield layer. The bottom metal layer is made up of a Ta layer and an NiFe layer formed on the Ta layer, for example.

As disclosed in JP-A-H11-509956, when the MR element is formed on the single conductor layer made of a material such as Rh, Al, Au, Ta or Ag that is provided on the bottom shield layer, it is difficult to form films having excellent crystallinity and orientability as the films making up the MR element. The reason would be that the surface of the above-mentioned conductor layer has a poor wettability.

Furthermore, in the head having the CPP structure, as disclosed in JP-A-2003-60262, when the MR element is formed on the bottom metal layer made up of the two layers of Ta and NiFe provided on the bottom shield layer, it is possible to form films having excellent crystallinity and orientability as the films making up the MR element. In this case, however, it is difficult to improve the characteristics of the MR element such as an MR ratio (a ratio of magnetoresistive change to the resistance).

OBJECT AND SUMMARY OF THE INVENTION

It is an object of the invention to provide a magnetoresistive device and a method of manufacturing the same, and a thin-film magnetic head, a head gimbal assembly and a hard disk drive each including a magnetoresistive device in which the crystallinity and orientability of the films making up the magnetoresistive element are improved to thereby improve the characteristics of the magnetoresistive device.

A magnetoresistive device of the invention comprises: a first shield layer and a second shield layer disposed at a specific distance from each other; a magnetoresistive element disposed between the first shield layer and the second shield layer; and an underlying layer disposed between the first shield layer and the magnetoresistive element. The underlying layer, the magnetoresistive element and the second shield layer are stacked on the first shield layer. The underlying layer includes: a first layer having surfaces one of which is in contact with the first shield layer or is adjacent to the first shield layer with a first conductive layer disposed in between; and a second layer having surfaces one of which is in contact with the other of the surfaces of the first layer and the other of which is in contact with the magnetoresistive element or is adjacent to the magnetoresistive element with a second conductive layer disposed in between. The first layer is made of a material including at least one of Ta (tantalum), Ti (titanium), W (tungsten), Hf (hafnium) and Y (yttrium). The second layer is made of an alloy including Ni (nickel) and Cr (chromium).

According to the magnetoresistive device of the invention, the underlying layer disposed between the first shield layer and the magnetoresistive element includes the first and second layers made of the above-mentioned materials. As a result, the crystallinity and orientability of the films making up the magnetoresistive element are improved. The characteristics of the magnetoresistive device are thereby improved.

In the magnetoresistive device of the invention, the one of the surfaces of the first layer may be in contact with the first shield layer, and the other of the surfaces of the second layer may be in contact with the magnetoresistive element. In addition, the first shield layer may be used for feeding the magnetoresistive element a current for detecting magnetic signals.

In the magnetoresistive device of the invention, the one of the surfaces of the first layer may be adjacent to the first shield layer with the first conductive layer disposed in between, and the other of the surfaces of the second layer may be in contact with the magnetoresistive element. In addition, the first conductive layer may be used for feeding the magnetoresistive element a current for detecting magnetic signals.

In the magnetoresistive device of the invention, the one of the surfaces of the first layer may be in contact with the first shield layer, and the other of the surfaces of the second layer may be adjacent to the magnetoresistive element with the second conductive layer disposed in between. In addition, the second conductive layer may be used for feeding the magnetoresistive element a current for detecting magnetic signals.

In the magnetoresistive device of the invention, the magnetoresistive element may be a spin-valve giant magnetoresistive element, or one utilizing a tunnel magnetoresistive effect.

According to the invention, a method is provided for manufacturing a magnetoresistive device comprising: a first shield layer and a second shield layer disposed at a specific distance from each other; a magnetoresistive element disposed between the first shield layer and the second shield layer; and an underlying layer disposed between the first shield layer and the magnetoresistive element. The underlying layer includes: a first layer having surfaces one of which is in contact with the first shield layer or is adjacent to the first shield layer with a first conductive layer disposed in between; and a second layer having surfaces one of which is in contact with the other of the surfaces of the first layer and the other of which is in contact with the magnetoresistive element or is adjacent to the magnetoresistive element with a second conductive layer disposed in between.

The method comprises the steps of: forming the first shield layer; forming the first layer of the underlying layer directly on the first shield layer or over the first shield layer with the first conductive layer disposed between the first shield layer and the first layer; forming the second layer on the first layer; forming the magnetoresistive element directly on the second layer or over the second layer with the second conductive layer disposed between the second layer and the magnetoresistive element; and forming the second shield layer on the magnetoresistive element. The first layer is made of a material including at least one of Ta, Ti, W, Hf and Y. The second layer is made of an alloy including Ni and Cr.

In the method of manufacturing the magnetoresistive device of the invention, the first layer may be formed directly on the first shield layer. In addition, the first layer, the second layer and the magnetoresistive element may be sequentially formed by a single thin-film forming method, and the first shield layer may be formed to be used for feeding the magnetoresistive element a current for detecting magnetic signals.

In the method of the invention, the first layer may be formed over the first shield layer with the first conductive layer disposed between the first shield layer and the first layer. In addition, the first layer, the second layer and the magnetoresistive element may be sequentially formed by a single thin-film forming method, and the first conductive layer may be formed to be used for feeding the magnetoresistive element a current for detecting magnetic signals.

In the method of the invention, the first layer may be formed directly on the first shield layer, and the magnetoresistive element may be formed over the second layer with the second conductive layer disposed between the second layer and the magnetoresistive element. In addition, the first layer, the second layer, the second conductive layer and the magnetoresistive element may be sequentially formed by a single thin-film forming method, and the second conductive layer may be formed to be used for feeding the magnetoresistive element a current for detecting magnetic signals.

In the method of the invention, the magnetoresistive element may be a spin-valve giant magnetoresistive element or one utilizing a tunnel magnetoresistive effect.

A thin-film magnetic head of the invention comprises: a medium facing surface that faces toward a recording medium; and the magnetoresistive device of the invention disposed near the medium facing surface to detect a signal magnetic field sent from the recording medium.

A head gimbal assembly of the invention comprises: a slider including the thin-film magnetic head of the invention and disposed to face toward a recording medium; and a suspension flexibly supporting the slider.

A hard disk drive of the invention comprises: a slider including the thin-film magnetic head of the invention and disposed to face toward a circular-plate-shaped recording medium that is rotated and driven; and an alignment device supporting the slider and aligning the slider with respect to the recording medium.

According to the magnetoresistive device or the method of manufacturing the same, the thin-film magnetic head, the head gimbal assembly, or the hard disk drive of the invention, the underlying layer disposed between the first shield layer and the magnetoresistive element includes: the first layer made of a material including at least one of Ta, Ti, W, Hf and Y; and the second layer made of an alloy including Ni and Cr. As a result, according to the invention, the crystallinity and orientability of the films making up the magnetoresistive element are improved. The characteristics of the magnetoresistive device are thereby improved.

Other and further objects, features and advantages of the invention will appear more fully from the following description.

DETAILED DESCRIPTION OF THE PREFERRED EMBODIMENTS

Preferred embodiments of the invention will now be described in detail with reference to the accompanying drawings.

First Embodiment

Figure 4:
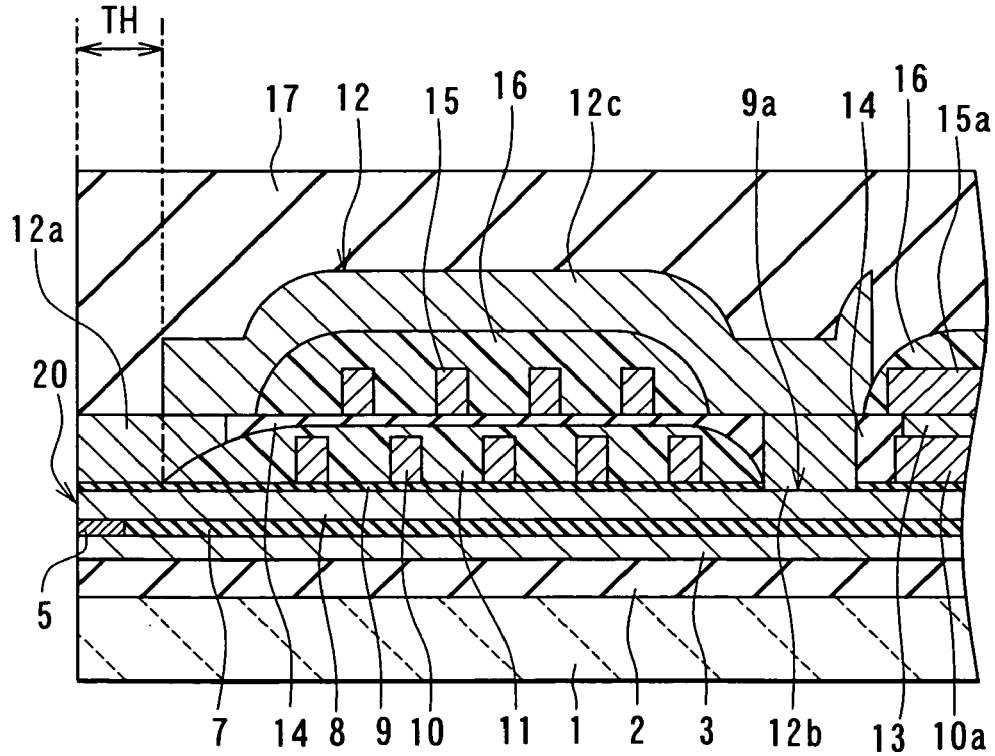
FIG. 4 is a cross-sectional view of a thin-film magnetic head of the first embodiment of the invention, wherein the cross section is orthogonal to the air bearing surface and the substrate.
Figure 5:
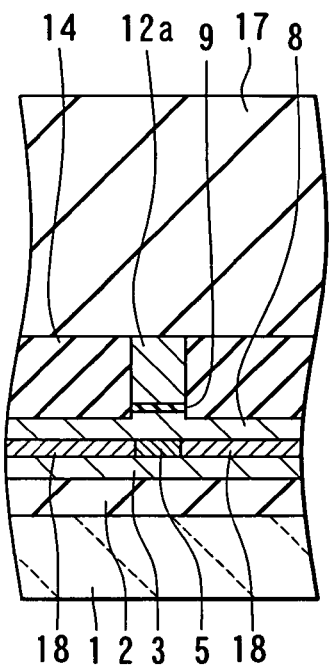
FIG. 5 is a cross-sectional view of a pole portion of the thin-film magnetic head of the first embodiment of the invention, wherein the cross section is parallel to the air bearing surface.

Reference is now made to FIG. 4 and FIG. 5 to describe the outlines of the configuration and a manufacturing method of a thin-film magnetic head of a first embodiment of the invention. FIG. 4 illustrates a cross section of the thin-film magnetic head orthogonal to the air bearing surface and a substrate. FIG. 5 illustrates a cross section of a pole portion of the thin-film magnetic head parallel to the air bearing surface.

In the method of manufacturing the thin-film magnetic head of the embodiment, first, an insulting layer 2 made of an insulating material such as alumina ($Al_2O_3$) and having a thickness of 1 to 5 µm, for example, is formed by a method such as sputtering on a substrate 1 made of a ceramic such as aluminum oxide and titanium carbide ($Al_2O_3$—TiC). Next, a first shield layer 3 for a read head having a specific pattern and made of a magnetic material such as NiFe or FeAlSi is formed on the insulating layer 2 by a method such as plating. Next, although not shown, an insulating layer of alumina, for example, is formed over the entire surface. Next, the insulating layer is polished by chemical mechanical polishing (CMP), for example, so that the first shield layer 3 is exposed, and the top surfaces of the first shield layer 3 and the insulating layer are thereby flattened.

Next, an MR element 5 for reading, two bias field applying layers 18 and an insulating layer 7 are formed on the first shield layer 3. The bias field applying layers 18 are disposed on both sides of the MR element 5. The insulating layer 7 is disposed around the MR element 5 and the bias field applying layers 18. The insulating layer 7 is made of an insulating material such as alumina.

Figure 15:
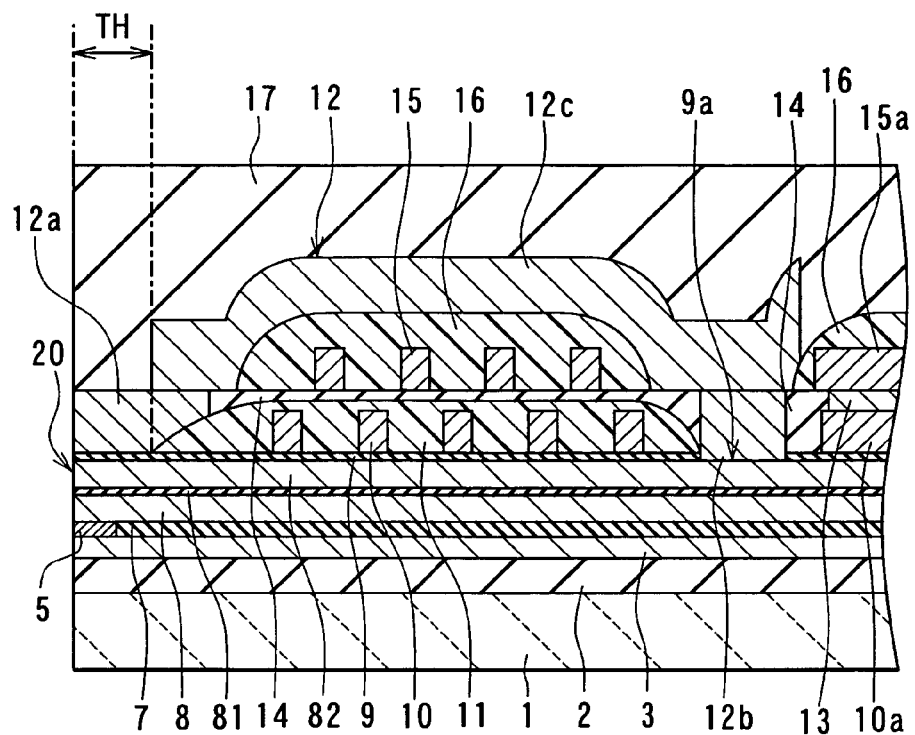
FIG. 15 is a cross-sectional view of a modification example of the thin-film magnetic head of the first embodiment of the invention, wherein the cross section is orthogonal to the air bearing surface and the substrate.
Figure 16:
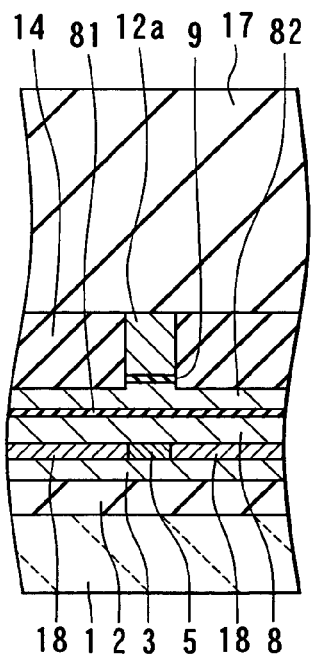
FIG. 16 is a cross-sectional view of a pole portion of the modification example of the thin-film magnetic head of the first embodiment of the invention, wherein the cross section is parallel to the air bearing surface.

Next, a second shield layer 8 for the read head is formed on the MR element 5, the bias field applying layers 18 and the insulating layer 7. The second shield layer 8 is made of a magnetic material and also functions as a bottom pole layer of a write head. The second shield layer 8 is made of a soft magnetic material such as NiFe, CoFe, CoFeNi or FeN. The second shield layer 8 is formed by plating or sputtering, for example. Alternatively, as shown in FIG. 15 and FIG. 16, the second shield layer 8 that also functions as the bottom pole layer may be replaced with a layered structure made up of: a second shield layer 8 that does not function as the bottom pole layer; a separating layer 81 made of a nonmagnetic material such as alumina and formed on the second shield layer 8 by a method such as sputtering; and a bottom pole layer 82 formed on the separating layer 81.

Next, a write gap layer 9 made of an insulating material such as alumina and having a thickness of 50 to 300 nm, for example, is formed on the second shield layer 8 (or the bottom pole layer 82) by a method such as sputtering. Next, to make a magnetic path, a portion of the write gap layer 9 is etched to form a contact hole 9a in a center portion of a thin-film coil described later.

Next, a first layer portion 10 of the thin-film coil made of copper (Cu), for example, and having a thickness of 2 to 3 µm, for example, is formed on the write gap layer 9. In FIG. 4 numeral 10a indicates a portion of the first layer portion 10 connected to a second layer portion 15 of the thin-film coil described later. The first layer portion 10 is wound around the contact hole 9a.

Next, an insulating layer 11 having a specific pattern is formed to cover the first layer portion 10 of the thin-film coil and the write gap layer 9 disposed around the first layer portion 10. The insulating layer 11 is made of an organic insulating material that exhibits fluidity when heated, such as photoresist. Next, heat processing is performed at a specific temperature to flatten the surface of the insulating layer 11. Through this heat processing, each of the outer and inner edge portions of the insulating layer 11 is made to have a shape of rounded sloped surface.

Next, a track width defining layer 12a of a top pole layer 12 made of a magnetic material for the write head is formed on regions of the write gap layer 9 and the insulating layer 11, the regions extending from a sloped portion of the insulating layer 11 closer to an air bearing surface 20 described later toward the air bearing surface 20. The top pole layer 12 is made up of the track width defining layer 12a, and a coupling portion layer 12b and a yoke portion layer 12c that will be described later.

The track width defining layer 12a has: a tip portion that is formed on the write gap layer 9 and functions as the pole portion of the top pole layer 12; and a connecting portion that is formed on the sloped portion of the insulating layer 11 closer to the air bearing surface 20 and connected to the yoke portion layer 12c. The tip portion has a width equal to the write track width. The connecting portion has a width greater than that of the tip portion.

When the track width defining layer 12a is formed, the coupling portion layer 12b made of a magnetic material is formed in the contact hole 9a and a connecting layer 13 made of a magnetic material is formed on the connecting portion 10a at the same time. The coupling portion layer 12b makes up a portion of the top pole layer 12 that is magnetically coupled to the second shield layer 8 (or the bottom pole layer 82).

Next, pole trimming is performed. That is, in a region around the track width defining layer 12a, the write gap layer 9 and at least part of the pole portion of the second shield layer 8 (or the bottom pole layer 82) close to the write gap layer 9 are etched, using the track width defining layer 12a as a mask. As a result, as shown in FIG. 5, a trim structure is formed, wherein the pole portion of the top pole layer 12, the write gap layer 9 and at least part of the pole portion of the second shield layer 8 (or the bottom pole layer 82) have equal widths. The trim structure has an effect of preventing an increase in effective track width resulting from an expansion of magnetic flux near the write gap layer 9.

Next, an insulating layer 14 made of an inorganic insulating material such as alumina and having a thickness of 3 to 4 μm, for example, is formed over the entire surface. The insulating layer 14 is then polished by CMP, for example, to reach the surfaces of the track width defining layer 12a, the coupling portion layer 12b and the connecting layer 13, and flattened.

Next, the second layer portion 15 of the thin-film coil made of copper (Cu), for example, and having a thickness of 2 to 3 μm, for example, is formed on the flattened insulating layer 14. In FIG. 4 numeral 15a indicates a portion of the second layer portion 15 connected to the connecting portion 10a of the first layer portion 10 of the thin-film coil through the connecting layer 13. The second layer portion 15 is wound around the coupling portion layer 12b.

Next, an insulating layer 16 having a specific pattern is formed to cover the second layer portion 15 of the thin-film coil and the insulating layer 14 disposed around the second layer portion 15. The insulating layer 16 is made of an organic insulating material that exhibits fluidity when heated, such as photoresist. Next, heat processing is performed at a specific temperature to flatten the surface of the insulating layer 16. Through this heat processing, each of the outer and inner edge portions of the insulating layer 16 is made to have a shape of rounded sloped surface.

Next, the yoke portion layer 12c made of a magnetic material for the write head such as Permalloy is formed on the track width defining layer 12a, the insulating layers 14 and 16, and the coupling portion layer 12b. The yoke portion layer 12c makes up the yoke portion of the top pole layer 12. The yoke portion layer 12c has an end disposed on a side of the air bearing surface 20, the end being located at a distance from the air bearing surface 20. The yoke portion layer 12c is connected to the second shield layer 8 (or the bottom pole layer 82) through the coupling portion layer 12b.

Next, an overcoat layer 17 made of alumina, for example, is formed to cover the entire surface. Finally, lapping of the slider including the foregoing layers is performed to form the air bearing surface 20 of the thin-film magnetic head including the write head and the read head. The thin-film magnetic head is thus completed.

The thin-film magnetic head thus manufactured comprises the air bearing surface 20 as the medium facing surface that faces toward a recording medium, the read head and the write head. The configuration of the read head will be described in detail later.

The write head incorporates the bottom pole layer (the second shield layer 8 or the bottom pole layer 82) and the top pole layer 12 that are magnetically coupled to each other and include the pole portions that are opposed to each other and placed in regions on a side of the air bearing surface 20. The write head further incorporates: the write gap layer 9 provided between the pole portion of the bottom pole layer and the pole portion of the top pole layer 12; and the thin-film coil including the portions 10 and 15 at least part of which is placed between the bottom pole layer and the top pole layer 12 and insulated from the bottom pole layer and the top pole layer 12. In the thin-film magnetic head, as shown in FIG. 4, throat height TH is the length from the air bearing surface 20 to the end of the insulating layer 11 closer to the air bearing surface 20. The throat height is the length (height) from the air bearing surface 20 to the point at which the space between the two pole layers starts to be increased.

Figure 1:
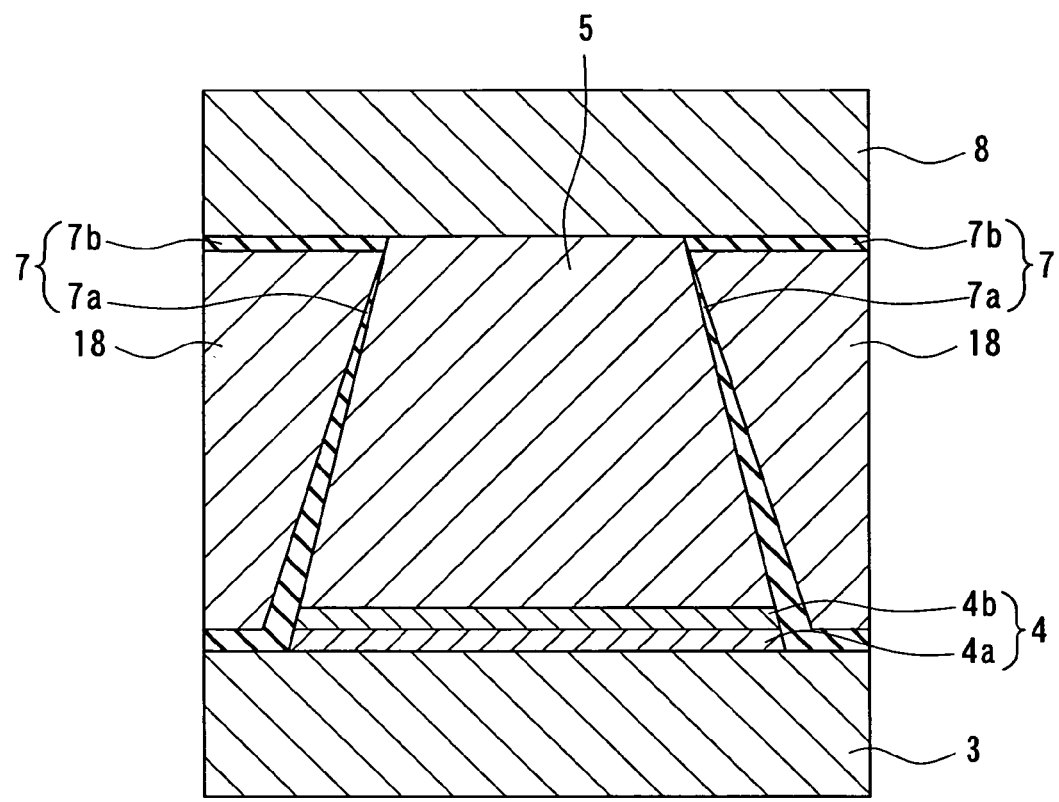
FIG. 1 is a cross-sectional view of a magnetoresistive device of a first embodiment of the invention, wherein the cross section is parallel to the air bearing surface.
Figure 2:
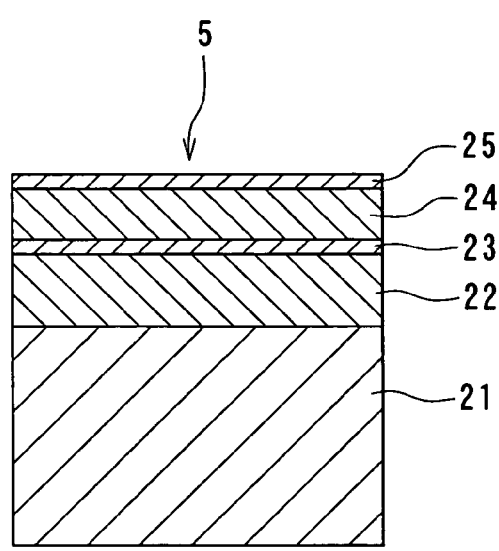
FIG. 2 is a cross-sectional view illustrating an example of configuration of an MR element of the first embodiment of the invention.
Figure 3:
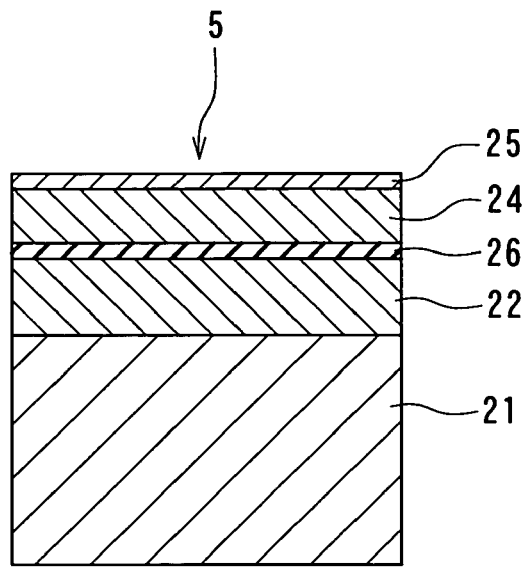
FIG. 3 is a cross-sectional view illustrating another example of configuration of the MR element of the first embodiment of the invention.

Reference is now made to FIG. 1 to FIG. 3 to describe the detail of the configuration of the read head, that is, the magnetoresistive device of the embodiment. FIG. 1 is a cross-sectional view of the magnetoresistive device, wherein the cross section is parallel to the air bearing surface. FIG. 2 is a cross-sectional view illustrating an example of configuration of the MR element. FIG. 3 is a cross-sectional view illustrating another example of configuration of the MR element.

As shown in FIG. 1, the magnetoresistive device of the embodiment comprises: the first shield layer 3 and the second shield layer 8 disposed at a specific distance from each other; the MR element 5 disposed between the first shield layer 3 and the second shield layer 8; and the underlying layer 4 disposed between the first shield layer 3 and the MR element 5. The underlying layer 4, the MR element 5 and the second shield layer 8 are stacked on the first shield layer 3.

The magnetoresistive device further comprises: the two bias field applying layers 18 that are disposed adjacent to the two sides of the MR element and apply a bias magnetic field to the MR element 5; and the insulating layer 7 disposed around the MR element 5 and the bias field applying layers 18. The bias field applying layers 18 are each made of a hard magnetic layer (a hard magnet) or a layered structure made up of a ferromagnetic layer and an antiferromagnetic layer, for example. The insulating layer 7 incorporates insulating films 7a and 7b. The insulating film 7a is disposed between the bias field applying layers 18 and each of the first shield layer 3, the underlying layer 4 and the MR element 5, and provides insulation between these layers. The insulating film 7b is provided between the bias field applying layers 18 and the second shield layer 8 and provides insulation between these layers.

The MR element 5 is a spin-valve GMR element or a TMR element utilizing a tunnel magnetoresistive effect, for example. The MR element 5 has a resistance that changes in response to an external magnetic field, that is, a signal magnetic field sent from a recording medium. The first and second shield layers 3 and 8 are used to feed the MR element 5 a sense current for detecting magnetic signals. The sense current is fed in the direction orthogonal to the surface of each of the films making up the MR element 5. It is possible that the resistance of the MR element 5 is obtained from the sense current. In such a manner, the data stored on the recording medium is read by the read head.

The underlying layer 4 includes: a first layer 4a having surfaces one of which (the bottom surface) is in contact with the first shield layer 3; and a second layer 4b having surfaces one of which (the bottom surface) is in contact with the other of the surfaces (the top surface) of the first layer 4a and the other of which (the top surface) is in contact with the MR element 5. The first layer 4a is made of a material including at least one of Ta, Ti, W, Hf and Y. The second layer 4b is made of an alloy containg Ni and Cr. The second layer 4b may be made of a material including at least one of Fe, Co, Cu, Au, Ag, Pt, Pd, Ru, Rh, Ti, Ta, W, V and Hf, in addition to Ni and Cr.

FIG. 2 illustrates an example of configuration of the MR element 5 when a spin-valve GMR element is used as the MR element 5. The MR element 5 incorporates an antiferromagnetic layer 21, a pinned layer 22, a nonmagnetic conductive layer 23, a free layer 24 and a protection layer 25 that are stacked one by one on the underlying layer 4. The pinned layer 22 is a layer in which the direction of magnetization is fixed. The antiferromagnetic layer 21 is a layer that fixes the direction of magnetization in the pinned layer 22. The free layer 24 is made of a soft magnetic layer in which the direction of magnetization varies in response to the signal magnetic field sent from the recording medium.

The antiferromagnetic layer 21 has a thickness of 5 to 30 nm, for example, and may be made of an antiferromagnetic material including Mn and at least one element $M_{II}$ among the group consisting of Pt, Ru, Rh, Pd, Ni, Au, Ag, Cu, Ir, Cr and Fe. The proportion of Mn preferably falls within a range of 35 to 95 atomic % inclusive. The proportion of the other element $M_{II}$ preferably falls within a range of 5 to 65 atomic % inclusive. Types of antiferromagnetic material include a non-heat-induced antiferromagnetic material that exhibits antiferromagnetism without any heat treatment and that induces an exchange coupling magnetic field between a ferromagnetic material and itself. Another type of antiferromagnetic material is a heat-induced antiferromagnetic material that exhibits antiferromagnetism when heat treatment is given. The antiferromagnetic layer 21 may be made of either of these types.

The non-heat-induced antiferromagnetic materials include an Mn alloy that has a γ phase, such as RuRhMn, FeMn, or IrMn. The heat-induced antiferromagnetic materials include an Mn alloy that has a regular crystal structure, such as PtMn, NiMn, or PtRhMn.

The direction of magnetization is fixed in the pinned layer 22 by means of the exchange coupling at the interface between the antiferromagnetic layer 21 and the pinned layer 22. The pinned layer 22 may have a structure in which a first ferromagnetic layer, a coupling layer and a second ferromagnetic layer are stacked in this order on the antiferromagnetic layer 21. The first and second ferromagnetic layers may be made of a ferromagnetic material including at least Co among the group consisting of Co and Fe. In particular, it is preferred that the (111) plane of this ferromagnetic material is oriented along the direction in which the layers are stacked. The total thickness of the two ferromagnetic layers is 1.5 to 5 nm, for example. The two ferromagnetic layers are antiferromagnetic-coupled to each other and the directions of magnetization thereof are fixed to opposite directions.

The coupling layer of the pinned layer 22 has a thickness of 0.2 to 1.2 nm, for example, and may be made of a nonmagnetic material including at least one element among the group consisting of Ru, Rh, Ir, Re, Cr and Zr. The coupling layer is provided for creating antiferromagnetic exchange coupling between the first and second ferromagnetic layers, and for fixing the magnetizations of these layers to opposite directions. The magnetizations of the first and second ferromagnetic layers in opposite directions include not only the case in which there is a difference of 180 degrees between these directions of magnetizations, but also the case in which there is a difference of 180±20 degrees between them.

The second ferromagnetic layer of the pinned layer 22 may contain a high resistance layer inside the ferromagnetic layer that has magnetism and an electric resistance greater than the other part. This high resistance layer is provided for reflecting at least part of the electrons so as to limit the movement of the electrons and thereby increasing the MR ratio of the MR element 5. It is preferred that the high resistance layer inside the ferromagnetic layer has a thickness of 0.3 to 1 nm, and includes at least one of an oxide, a nitride, and a nitride oxide, which is magnetically stable and capable of reducing variation in output. This high resistance layer may be formed through oxidizing, nitriding, or both oxidizing and nitriding part of the material making the other part of the second ferromagnetic layer.

The nonmagnetic conductive layer 23 has a thickness of 1.0 to 3.0 nm, for example, and may be made of a nonmagnetic conductive material that includes 80 weight % or greater of at least one element among the group consisting of Cu, Au and Ag.

The free layer 24 has a thickness of 1.0 to 8.0 nm, for example, and may be made up of a single layer or two layers or more. Here, an example in which the free layer 24 is made up of two soft magnetic layers will be given. One of the two soft magnetic layers that is closer to the nonmagnetic conductive layer 23 is called a first soft magnetic layer. The other one that is closer to the protection layer 25 is called a second soft magnetic layer.

The first soft magnetic layer has a thickness of 0.5 to 3 nm, for example, and may be made of a magnetic material including at least Co among the group consisting of Ni, Co, and Fe. To be specific, the first soft magnetic layer is preferably made of $Co_xFe_yNi_{100-(x+y)}$ in which the (111) plane is oriented along the direction in which the layers are stacked. In the formula, x and y fall within ranges of $70 \leq x \leq 100$ and $0 \leq y \leq 25$, respectively, in atomic percent.

The second soft magnetic layer has a thickness of 0.5 to 8 nm, for example, and may be made of a magnetic material including at least Ni among the group consisting of Ni, Co, Fe, Ta, Cr, Rh, Mo and Nb. To be specific, the second soft magnetic layer is preferably made of $[Ni_xCo_yFe_{100-(x+y)}]_{100-z}M_{I_z}$. In the formula, $M_I$ represents at least one of Ta, Cr, Rh, Mo and Nb. X, y and z fall within ranges of $75 \leq x \leq 90$, $0 \leq y \leq 15$, and $0 \leq z \leq 15$, respectively, in atomic percent.

The protection layer 25 has a thickness of 0.5 to 10 nm, for example, and may be made of Ta. The protection layer 25 may have a two-layer structure made up of a combination of a Ta layer and a Ru layer, for example, or may have a three-layer structure made up of a combination of a Ta layer, a Ru layer, and a Ta layer, for example.

A nonmagnetic conductive layer such as a Cu layer may be provided between the free layer 24 and the protection layer 25. This nonmagnetic conductive layer is provided for having the electrons passing through the free layer 24 reflected off the interface between the nonmagnetic conductive layer and the protection layer 25 and thereby increasing the MR ratio of the MR element 5 and improving the stability of the characteristics.

FIG. 3 illustrates an example of configuration of the MR element 5 when a TMR element is used as the MR element 5. The MR element 5 has a configuration in which a tunnel barrier layer 26 made of a nonmagnetic insulating layer is provided in place of the nonmagnetic conductive layer 23 of the MR element 5 shown in FIG. 2. The tunnel barrier layer 26 is such a layer that electrons can pass therethrough while maintaining the spin by means of the tunnel effect. The tunnel barrier layer 26 has a thickness of 0.5 to 2 nm, for example, and is made of a material such as $Al_2O_3$, NiO, GdO, MgO, $Ta_2O_5$, $MoO_2$, $TiO_2$ or $WO_2$. The remainder of configuration of the MR element 5 of FIG. 3 is the same as that of the MR element 5 of FIG. 2.

The configuration of the MR element 5 may be an upside-down one of the configuration shown in FIG. 2 or FIG. 3.

A method of manufacturing the magnetoresistive device of the embodiment will now be described. According to the method, the first shield layer 3 having a specific pattern is first formed by plating, for example, on the insulating layer 2. Next, although not shown, an insulating layer of alumina, for example, is formed over the entire surface. Next, this insulating layer is polished by CMP, for example, so that the first shield layer 3 is exposed, and the top surfaces of the first shield layer 3 and the insulating layer are thereby flattened. At this time, since the top surface of the first shield layer 3 is exposed to the atmosphere, a thin oxide film is formed near the top surface of the first shield layer 3. Next, the oxide film formed near the top surface of the first shield layer 3 is removed by inverse sputtering (sputter-etching), for example. Next, the first layer 4a, the second layer 4b and the MR element 5 are sequentially formed on the first shield layer 3 by a single thin-film forming method, such as sputtering. Removal of the oxide film formed near the top surface of the first shield layer 3 and formation of the first layer 4a, the second layer 4b and the MR element 5 are performed in a vacuum without undergoing exposure to the atmosphere in the course of the process.

Next, the underlying layer 4 and the MR element 5 are patterned by etching. Next, the insulating film 7a, the bias field applying layers 18 and the insulating film 7b are formed one by one by sputtering, for example. Next, the second shield layer 8 is formed by plating or sputtering, for example, on the MR element 5 and the insulating film 7b.

The operation of the magnetoresistive device and the thin-film magnetic head of the embodiment will now be described. The thin-film magnetic head writes data on a recording medium by using the write head and reads data written on the recording medium by using the magnetoresistive device that serves as the read head.

In the read head, the direction of the bias magnetic field created by the bias field applying layers 18 intersects the direction orthogonal to the air bearing surface 20 at a right angle. In the MR element 5 the direction of magnetization of the free layer 24 is aligned with the direction of the bias field when no signal magnetic field exists. The direction of magnetization of the pinned layer 22 is fixed to the direction orthogonal to the air bearing surface 20.

In the MR element 5, the direction of magnetization of the free layer 24 changes in response to the signal field sent from the recording medium. The relative angle between the direction of magnetization of the free layer 24 and the direction of magnetization of the pinned layer 22 is thereby changed. As a result, the resistance of the MR element 5 changes. The resistance of the MR element 5 is obtained from the potential difference between the first and second shield layers 3 and 8 when a sense current is fed to the MR element 5 from the shield layers 3 and 8. In such a manner, the data stored on the recording medium is read by the read head.

The feature of the underlying layer 4 of the embodiment will now be described. According to the embodiment, as described above, the underlying layer 4 includes: the first layer 4a having the surfaces one of which (the bottom surface) is in contact with the first shield layer 3; and the second layer 4b having the surfaces one of which (the bottom surface) is in contact with the other of the surfaces (the top surface) of the first layer 4a and the other of which (the top surface) is in contact with the MR element 5. The first layer 4a is made of a material including at least one of Ta, Ti, W, Hf and Y. The second layer 4b is made of a material including NiCr. As a result, the crystallinity and orientability of the films making up the MR element 5 are improved. The characteristics of the magnetoresisitive device are thereby improved.

The results of experiments performed for confirming the effect obtained by the above-mentioned feature of the underlying layer 4 will now be described. A first experiment will be first described. The first experiment was performed to find out the effect of a layer underlying the MR element 5 exerted on the crystallinity and orientability of the films making up the MR element 5.

In the first experiment a spin-valve GMR element was used as the MR element 5. The MR element 5 had the following configuration. The antiferromagnetic layer 21 was a PtMn layer having a thickness of 13 nm. The pinned layer 22 had a structure in which a CoFe layer having a thickness of 1.5 nm as the first ferromagnetic layer, a Ru layer having a thickness of 0.8 nm as the coupling layer, and two CoFe layers each having a thickness of 1.5 nm as the second ferromagnetic layer were stacked in this order. In the second ferromagnetic layer, an oxide layer formed by oxidizing part of the CoFe layer was provided as the high resistance layer inside the ferromagnetic layer between the two CoFe layers each having a thickness of 1.5 nm. The nonmagnetic conductive layer 23 was a Cu layer having a thickness of 2.3 nm. The free layer 24 was a CoFe layer having a thickness of 3 nm. The protection layer 25 was a Ta layer having a thickness of 0.8 nm. A Cu layer having a thickness of 0.5 nm was provided as a nonmagnetic conductive layer between the free layer 24 and the protection layer 25.

In the first experiment the following four sample magnetoresistive devices were fabricated. Two of the samples were those of first and second examples of the embodiment of the invention. The other two of the samples were those of first and second reference examples. In both the samples of the first and second examples of the embodiment, the MR element 5 was formed on the underlying layer 4 provided on the first shield layer 3. In the sample of the first example, the underlying layer 4 had the first layer 4a made of a Ta layer having a thickness of 0.5 nm and the second layer 4b made of a NiCr layer having a thickness of 5 nm. In the sample of the second example, the underlying layer 4 had the first layer 4a made of a Ta layer having a thickness of 3 nm and the second layer 4b made of a NiCr layer having a thickness of 5 nm. In the sample of the first reference example, the MR element 5 was formed on a single NiCr layer having a thickness of 5 nm provided on the first shield layer 3. In the sample of the second reference example, a Ta layer having a thickness of 3 nm was formed on the first shield layer 3, a NiFe layer having a thickness of 2 nm was formed on the Ta layer, and the MR element 5 was formed on the NiFe layer. In each of the samples the first shield layer 3 was made of NiFe. In each of the samples an oxide film formed near the top surface of the first shield layer 3 was removed and then the upper layers were consecutively formed.

Figure 10:
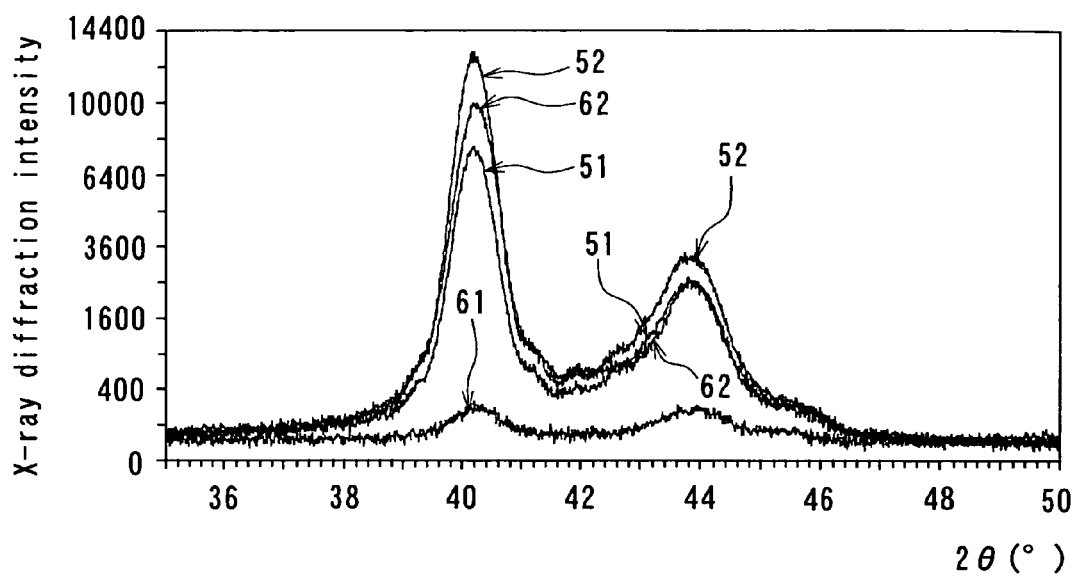
FIG. 10 is a plot showing an effect resulting from the feature of the underlying layer of the first embodiment of the invention.

FIG. 10 illustrates the result of measurement of X-ray diffraction intensity of the MR element 5 by the θ-2θ method for each of the above-mentioned four samples. In FIG. 10 the horizontal axis indicates 2θ (degrees) and the vertical axis indicates the X-ray diffraction intensity, where θ is a Bragg angle. The X-ray diffraction intensity is expressed in the number of X rays counted per second. In FIG. 10, numeral 51 indicates the X-ray diffraction intensity of the sample of the first example of the embodiment. Numeral 52 indicates the X-ray diffraction intensity of the sample of the second example of the embodiment. Numeral 61 indicates the X-ray diffraction intensity of the sample of the first reference example. Numeral 62 indicates the X-ray diffraction intensity of the sample of the second reference example.

The X-ray diffraction intensity of each of the samples shown in FIG. 10 has a first peak near the point at which 2θ is 40 degrees, and has a second peak near the point at which 2θ is 44 degrees. The first peak corresponds to the reflection off the (111) plane of the antiferromagnetic layer 21. The second peak corresponds to the reflection off the (111) plane of the multi-layer film made up of the pinned layer 22, the nonmagnetic conductive layer 23 and the free layer 24.

The table below shows the peak intensity (counts/second) at the first peak and the orientation angle (degrees) for each of the four samples. The orientation angle mentioned here indicates the degree of expansion of distribution of peaks of a diffraction line created by reflection off the (111) plane in which the direction of the normal is orthogonal to the film surface. Here, the orientation angle is indicated as a full width at half maximum of the rocking curve. The rocking curve is the intensity distribution curve of the diffraction line when a monochrome X ray is applied to the crystal plane from a specific direction and the crystal is rotated near the orientation that satisfies the Bragg condition.

TABLE 1

| Sample | Peak intensity | Orientation angle |
| --- | --- | --- |
| First reference example | 120 | (Isotropic) |
| First example | 7521.1 | 5.90 |
| Second example | 12626.6 | 4.43 |
| Second reference example | 9776.8 | 4.41 |

The table below shows the peak intensity at the second peak and the orientation angle for each of the four samples.

TABLE 2

| Sample | Peak intensity | Orientation angle |
| --- | --- | --- |
| First reference example | 110 | (Isotropic) |
| First example | 2445.8 | 5.85 |
| Second example | 3213.5 | 4.63 |
| Second reference example | 2478.3 | 4.45 |

The higher the crystallinity and orientability of the films making up the MR element 5, the greater is the peak intensity and the smaller is the orientation angle. As FIG. 10 and the above two tables show, the films making up the MR element 5 have a low crystallinity and a low orientability, according to the sample of the first reference example wherein the MR element 5 is formed on the single NiCr layer provided on the first shield layer 3. In contrast, the films making up the MR element 5 have a high crystallinity and a high orientability, according to the samples of the first and second examples wherein the MR element 5 is formed over the first shield layer 3 with the Ta layer and the NiCr layer provided between the MR element 5 and the first shield layer 3. In addition, the films making up the MR element 5 have a high crystallinity and a high orientability, too, according to the sample of the second reference example wherein the MR element 5 is formed over the first shield layer 3 with the Ta layer and the NiFe layer provided between the MR element 5 and the first shield layer 3. However, as will be described later, it is difficult to improve the characteristics, such as the MR ratio, of the MR element 5 of the sample of the second reference example.

A second experiment will now be described. The second experiment was performed to find out the effect of a layer underlying the MR element 5 exerted on the characteristics of the MR element 5. Each of the MR elements 5 used for the second experiment had a configuration the same as that of each of the MR elements 5 used for the first experiment. For the second experiment, seven sample magnetoresistive devices were fabricated, wherein the second layer 4b of the underlying layer 4 was a NiCr layer having a thickness of 5 nm. One of the seven samples had no first layer 4a and was the same as the sample of the first reference example of the first experiment. In each of the other six samples, the first layer 4a was a Ta layer. The first layers 4a of the six samples had thicknesses of 0.1 nm, 0.3 nm, 0.5 nm, 1 nm, 3 nm and 5 nm, respectively. The table below shows the characteristics of the MR elements 5 of the seven samples in comparison with the sample of the second reference example of the first experiment.

TABLE 3

| Thickness of first layer (nm) | MR ratio | Hk (Oe = × 79.6 A/m) | Hex |
| --- | --- | --- | --- |
| 0 | 0.85 | 0.5 | 0.80 |
| 0.1 | 0.84 | −4.0 | 0.82 |
| 0.3 | 1.17 | −8.3 | 1.45 |
| 0.5 | 1.19 | −8.1 | 1.43 |
| 1.0 | 1.17 | −8.6 | 1.42 |
| 3.0 | 1.17 | −9.4 | 1.41 |
| 5.0 | 1.13 | −9.4 | 1.41 |

The value of each MR ratio shown in the table above is expressed as the ratio of the actual MR ratio of each of the seven samples with respect to the actual MR ratio of the sample of the second reference example. According to each of the samples having the first layer 4a of 0.3 nm or greater in thickness, the MR ratio is greater, compared with the sample having no first layer 4a or the sample of the second reference example.

Figure 11:
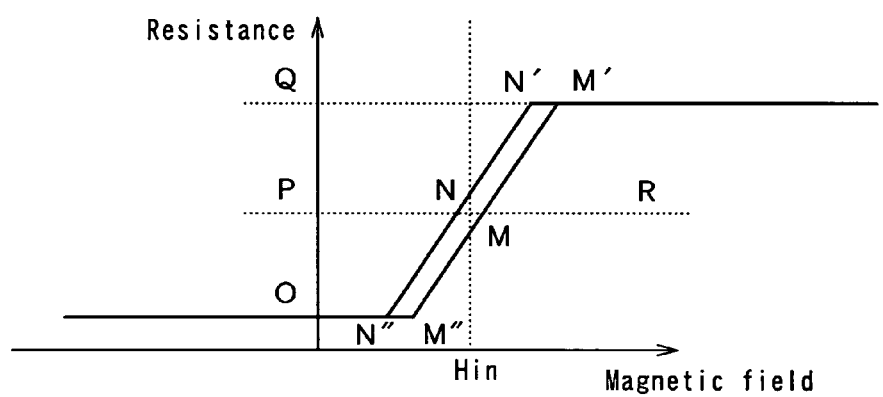
FIG. 11 is a plot showing a minor loop that indicates magnetization reversal of the free layer of the MR element.

Hk is a parameter corresponding to the anisotropic magnetic field of the free layer 24. In the second experiment, Hk was obtained from a minor loop indicating the magnetization reversal of the free layer 24 as will be described below. FIG. 11 shows the minor loop indicating the magnetization reversal of the free layer 24 as an approximated straight line. In FIG. 11 the horizontal axis indicates the magnetic field applied to the MR element, and the vertical axis indicates the resistance of the MR element. O indicates the minimum resistance of the MR element. Q indicates the maximum resistance of the MR element. Straight line PR indicates a mean value of the minimum and maximum resistances. M indicates one of the two points at which the straight line PR intersects the minor loop, the point representing a greater magnetic field. N indicates the other one of the two points, the point representing a smaller magnetic field. In the minor loop, M' indicates the point corresponding to the maximum magnetic field when the resistance of the MR element is the maximum resistance Q, and N' indicates the point corresponding to the minimum magnetic field when the resistance of the MR element is the maximum resistance Q. In the minor loop, M" indicates the point corresponding to the maximum magnetic field when the resistance of the MR element is the minimum resistance O, and N" indicates the point corresponding to the minimum magnetic field when the resistance of the MR element is the minimum resistance O.

Here, the magnetic field at the middle point between the points M and N is indicated as Hin. The magnetic fields at the points M', N', M" and N" are H(M'), H(N'), H(M") and H(N"), respectively. Hk of the second experiment is expressed by the equation below.

$$Hk=[\{H(M')-Hin\}+\{H(N')-Hin\}+\{Hin-H(M')\}+\{Hin-H(N')\}]/4$$

Each of the values of Hk listed in the table above is indicated as the difference between the actual Hk of each of the seven samples and the actual Hk of the sample of the second reference example. The smaller the value of Hk, the higher is the sensitivity of the free layer 24. According to each of the samples having the first layers 4a, the value of Hk is smaller, compared with the sample without the first layer 4a or the sample of the second reference example.

Figure 12:
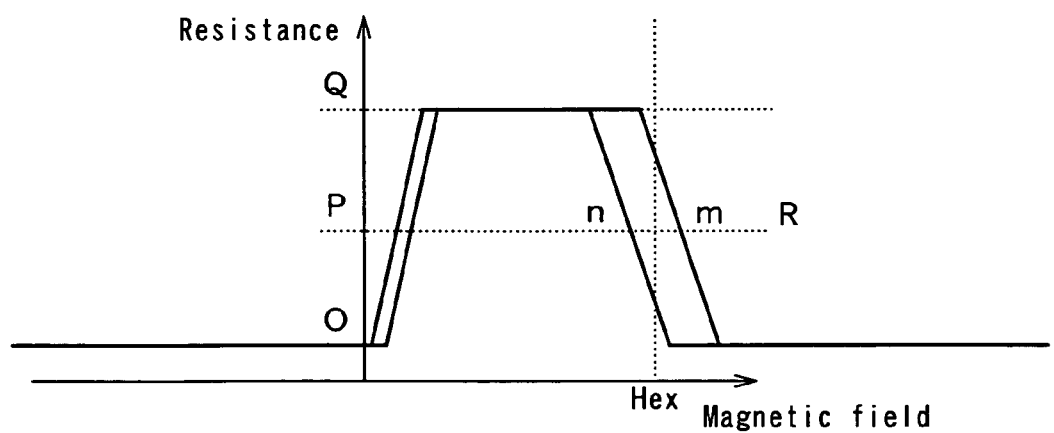
FIG. 12 is a plot showing a hysteresis loop that indicates magnetization reversal of the pinned layer of the MR element.

Hex indicates the exchange coupling magnetic field of the pinned layer 22. In the second experiment, Hex was obtained from the hysteresis loop indicating the magnetization reversal of the pinned layer 22 as will be shown below. FIG. 12 shows the hysteresis loop indicating the magnetization reversal of the pinned layer 22. In FIG. 12 the horizontal axis indicates the magnetic field applied to the MR element, and the vertical axis indicates the resistance of the MR element. O indicates the minimum resistance of the MR element. Q indicates the maximum resistance of the MR element. Straight line PR indicates a mean value of the minimum and maximum resistances. In FIG. 12 the right-hand loop indicates the magnetization reversal of the pinned layer 22. One of the two points at which the straight line PR intersects the right-hand loop, the point representing a greater magnetic field, is indicated with "m". The other one of the two points, the point representing a smaller magnetic field, is indicated with "n". The magnetic field at the middle point between the points m and n is Hex.

Each of the values of Hex shown in the table above is indicated as the ratio of the actual Hex of each of the seven samples with respect to the actual Hex of the sample of the second reference example. Hex represents the resistance of the pinned layer 22 to the external magnetic field. The reliability and output of the MR element improve as the value of Hex increases. According to each of the samples whose first layer 4a is 0.3 nm or greater in thickness, the value of Hex is greater, compared with the sample without the first layer 4a or the sample of the second reference example.

As the result of the second experiment shows, when the MR element 5 was formed over the first shield layer 3 with the Ta layer and the NiCr layer disposed in between, the MR ratio was greater, the value of Hk was lower, and the value of Hex was greater, which means that the characteristics of the MR element 5 improved, compared with the case in which the MR element 5 was formed over the first shield layer 3 with the Ta layer and the NiFe layer disposed in between.

In the first and second experiments, the first layer 4a was made of Ta and the second layer 4b was made of NiCr. However, results similar to the above-described results of the experiments will be obtained if the first layer 4a is made of a material containing at least one of Ti, W, Hf and Y, and the second layer 4b is made of a material containing at least one of Fe, Co, Cu, Au, Ag, Pt, Pd, Ru, Rh, Ti, Ta, W, V and Hf, in addition to Ni and Cr.

The configuration of the underlying layer 4 of the embodiment exhibits its effects in a read head of the CPP structure wherein the MR element is disposed on the shield layer made of a magnetic metal material. However, the configuration of the underlying layer 4 of the embodiment does not exhibit its effects in a read head of the CIP structure wherein the MR element is disposed on the insulating film. A third experiment that indicates this fact will now be described.

For the third experiment, the MR element was formed on the underlying layer provided on an $Al_2O_3$ layer having a thickness of 40 nm. The configuration of the MR element was as follows. The antiferromagnetic layer disposed on the underlying layer was a PtMn layer having a thickness of 15 nm. The pinned layer disposed on the antiferromagnetic layer had a structure in which a CoFe layer having a thickness of 1.5 nm, a Ru layer having a thickness of 0.8 nm, and a CoFe layer having a thickness of 2.5 nm were stacked in this order. The nonmagnetic conductive layer was a Cu layer having a thickness of 2.4 nm. The free layer had a structure in which a CoFe layer having a thickness of 1 nm and a NiFe layer having a thickness of 3 nm were stacked. The protection layer was a Ta layer having a thickness of 2 nm.

The underlying layer of the third experiment was prepared in two types: one made up only of a NiCr layer having a thickness of 5 nm; and the other made up of a Ta layer and a 5-nm-thick NiCr layer disposed on the Ta layer. For the third experiment, five samples of magnetoresistive devices were fabricated. One of the five samples had the underlying layer made up only of the NiCr layer. The other four samples each had the underlying layer made up of the Ta layer and the NiCr layer. The Ta layers of the four samples had thicknesses of 1 nm, 1.5 nm, 2.0 nm and 3.0 nm, respectively. The table below shows the characteristics of the MR elements of the five samples.

TABLE 4

| Thickness of Ta layer (nm) | MR ratio (%) | Amount of change in resistance (Ω/square) | Hex (Oe = × 79.6 A/m) |
|---|---|---|---|
| 0 | 13.09 | 1.91 | 1229.0 |
| 1.0 | 12.88 | 1.86 | 1226.5 |
| 1.5 | 12.46 | 1.83 | 1184.8 |
| 2.0 | 12.29 | 1.80 | 1170.7 |
| 3.0 | 11.83 | 1.75 | 1198.6 |

As the table above shows, when the underlying layer made up of the Ta layer and the NiCr layer is used for a read head of the CIP structure, the MR ratio, the amount of change in resistance and the value of Hex are lower, compared with the case in which the underlying layer used is made up of the NiCr layer only. That is, the characteristics of the MR element are reduced.

Figure 6:
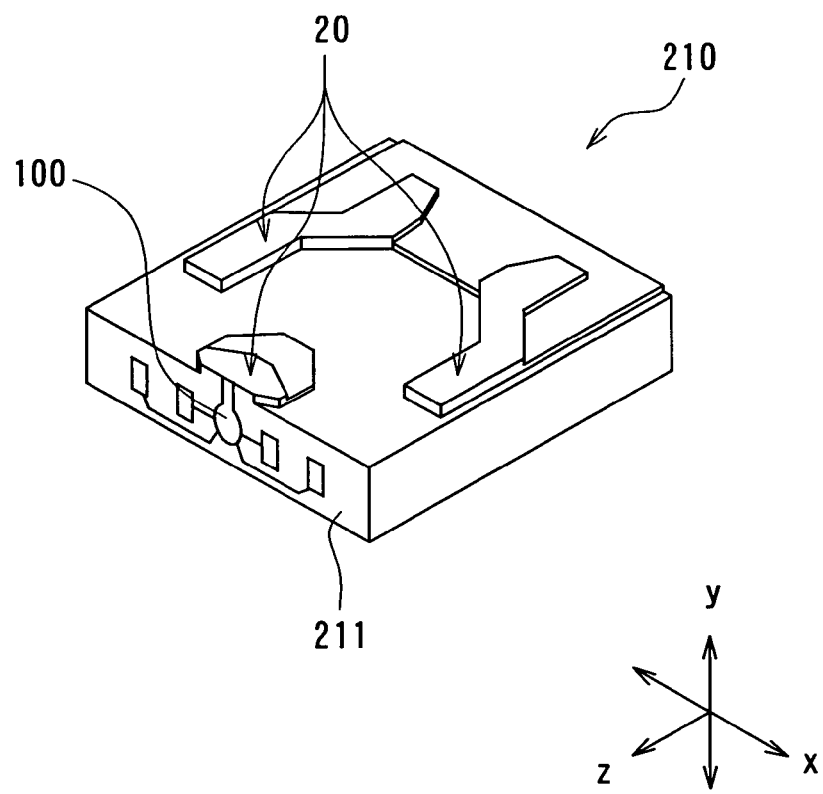
FIG. 6 is a perspective view that illustrates a slider incorporated in a head gimbal assembly of the first embodiment of the invention.

A head gimbal assembly and a hard disk drive of the embodiment will now be described. Reference is made to FIG. 6 to describe a slider 210 incorporated in the head gimbal assembly. In the hard disk drive the slider 210 is placed to face toward a hard disk platter that is a circular-plate-shaped recording medium to be rotated and driven. The slider 210 has a base body 211 made up mainly of the substrate 1 and the overcoat layer 17 of FIG. 4. The base body 211 is nearly hexahedron-shaped. One of the six surfaces of the base body 211 faces toward the hard disk platter. The air bearing surface 20 is formed in this one of the surfaces. When the hard disk platter rotates in the z direction of FIG. 6, an airflow passes between the hard disk platter and the slider 210 and a lift is thereby generated below the slider 210 in the y direction of FIG. 6 and exerted on the slider 210. The slider 210 flies over the hard disk platter by means of the lift. The x direction of FIG. 6 is across the tracks of the hard disk platter. A thin-film magnetic head 100 of the embodiment is formed near the air-outflow-side end (the end located at the lower left of FIG. 6) of the slider 210.

Figure 7:
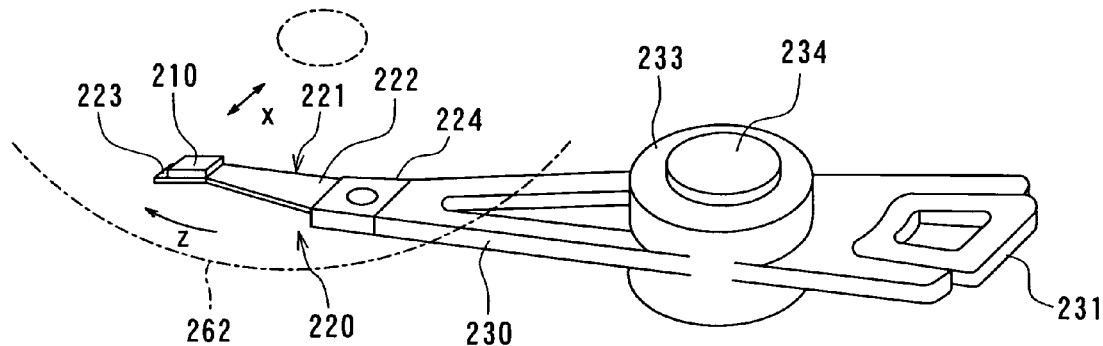
FIG. 7 is a perspective view that illustrates a head arm assembly including the head gimbal assembly of the first embodiment of the invention.

Reference is now made to FIG. 7 to describe a head gimbal assembly 220 of the embodiment. The head gimbal assembly 220 comprises the slider 210 and a suspension 221 that flexibly supports the slider 210. The suspension 221 incorporates: a plate-spring-shaped load beam 222 made of stainless steel, for example; a flexure 223 to which the slider 210 is joined, the flexure being located at an end of the load beam 222 and giving an appropriate degree of freedom to the slider 210; and a base plate 224 located at the other end of the load beam 222. The base plate 224 is attached to an arm 230 of an actuator for moving the slider 210 along the x direction across the tracks of the hard disk platter 262. The actuator incorporates the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembled body comprising the arm 230 and the head gimbal assembly 220 attached to the arm 230 is called a head arm assembly. An assembled body comprising a carriage having a plurality of arms wherein the head gimbal assembly 220 is attached to each of the arms is called a head stack assembly.

FIG. 7 illustrates an example of the head arm assembly. In the head arm assembly the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Figure 8:
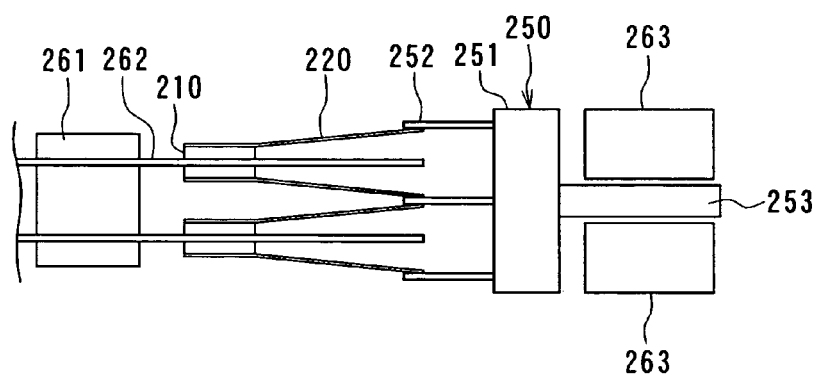
FIG. 8 illustrates the main part of a hard disk drive of the first embodiment of the invention.
Figure 9:
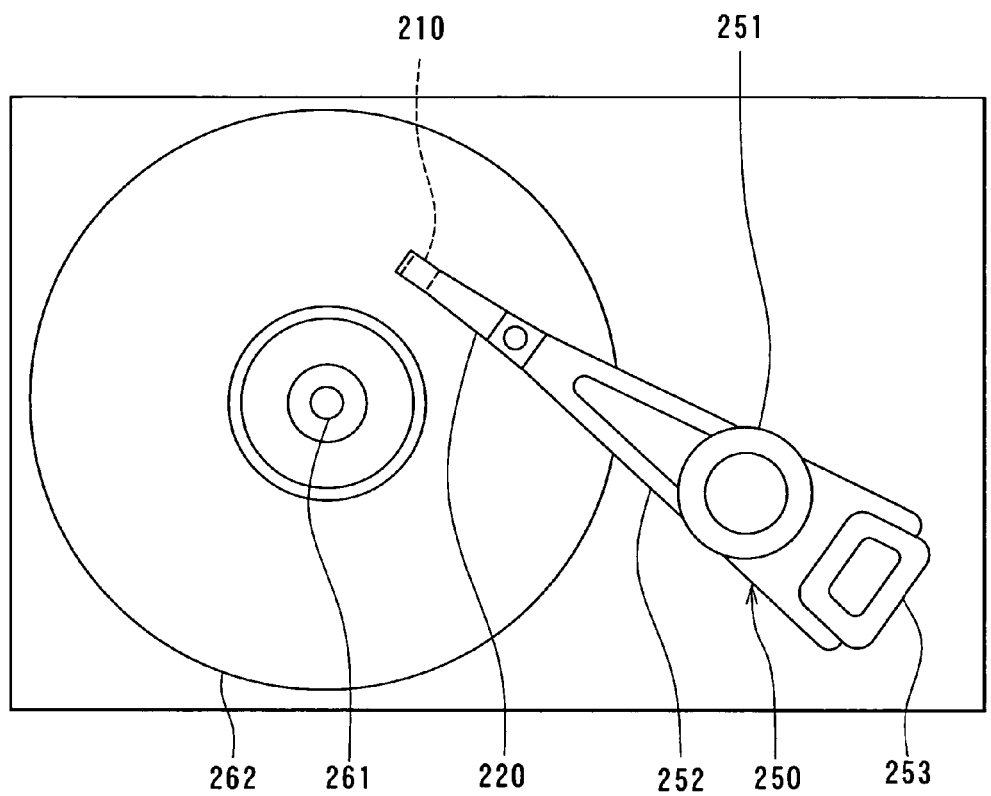
FIG. 9 is a top view of the hard disk drive of the first embodiment of the invention.

Reference is now made to FIG. 8 and FIG. 9 to describe an example of the head stack assembly and the hard disk drive of the embodiment. FIG. 8 illustrates the main part of the hard disk drive. FIG. 9 is a top view of the hard disk drive. The head stack assembly 250 incorporates a carriage 251 having a plurality of arms 252. A plurality of head gimbal assemblies 220 are attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the hard disk drive. The hard disk drive includes a plurality of hard disk platters 262 mounted on a spindle motor 261. Two of the sliders 210 are allocated to each of the platters 262, such that the two sliders 210 are opposed to each other with each of the platters 262 disposed in between. The voice coil motor includes permanent magnets 263 disposed to be opposed to each other, the coil 253 of the head stack assembly 250 being placed between the magnets 263.

The actuator and the head stack assembly 250 except the sliders 210 correspond to the alignment device of the invention and support the sliders 210 and align them with respect to the hard disk platters 262.

In the hard disk drive of the embodiment the actuator moves the slider 210 across the tracks of the hard disk platter 262 and aligns the slider 210 with respect to the hard disk platter 262. The thin-film magnetic head incorporated in the slider 210 writes data on the hard disk platter 262 through the use of the write head and reads data stored on the hard disk platter 262 through the use of the read head.

The head gimbal assembly and the hard disk drive of the embodiment exhibit effects similar to those of the foregoing thin-film magnetic head of the embodiment.

Second Embodiment

Figure 13:
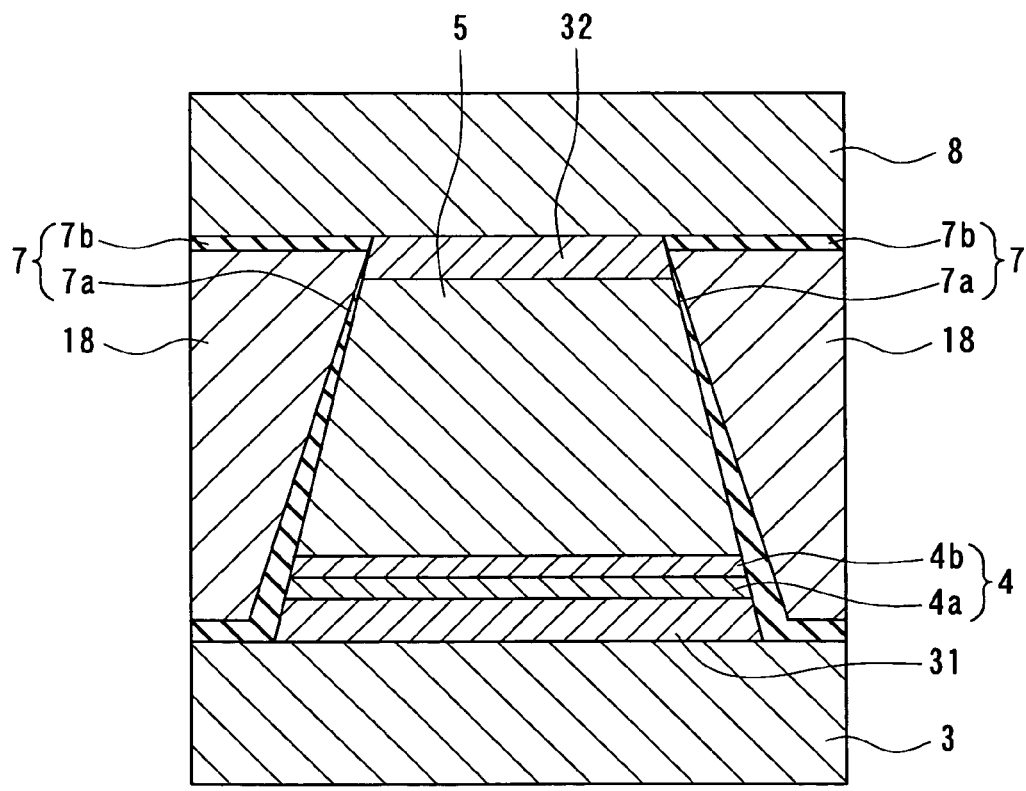
FIG. 13 is a cross-sectional view of a magnetoresistive device of a second embodiment of the invention, wherein the cross section is parallel to the air bearing surface.

Reference is now made to FIG. 13 to describe the configuration of a magnetoresistive device of a second embodiment of the invention. FIG. 13 is a cross-sectional view of the magnetoresistive device of the embodiment parallel to the air bearing surface. As the first embodiment, the magnetoresistive device of the second embodiment comprises: the first shield layer 3 and the second shield layer 8 disposed at a specific distance from each other; the MR element 5 disposed between the first shield layer 3 and the second shield layer 8; and the underlying layer 4 disposed between the first shield layer 3 and the MR element 5. The magnetoresistive device of the second embodiment further comprises: a conductive layer 31 disposed between the first shield layer 3 and the underlying layer 4; and a conductive layer 32 disposed between the MR element 5 and the second shield layer 8. The conductive layer 31, the underlying layer 4, the MR element 5, the conductive layer 32 and the second shield layer 8 are stacked on the first shield layer 3. The conductive layer 31 corresponds to the first conductive layer of the invention. The conductive layers 31 and 32 are used for feeding a sense current to the MR element 5. As the first embodiment, the MR element 5 is a spin-valve GMR element or a TMR element utilizing the tunnel magnetoresistive effect, for example.

As the first embodiment, the underlying layer 4 has the first layer 4a and the second layer 4b. According to the second embodiment, the bottom surface of the first layer 4a is adjacent to the first shield layer 3 with the conductive layer 31 disposed in between. The bottom surface of the second layer 4b is in contact with the top surface of the first layer 4a. The top surface of the second layer 4b is in contact with the MR element 5. Each of the first layer 4a and the second layer 4b is made of a material the same as that of the first embodiment.

As the magnetoresistive device of the first embodiment, the magnetoresistive device of the second embodiment further comprises: the two bias field applying layers 18 that are disposed adjacent to the two sides of the MR element 5 and apply a bias magnetic field to the MR element 5; and the insulating layer 7 disposed around the MR element 5 and the bias field applying layers 18. The insulating layer 7 incorporates the insulating films 7a and 7b. The insulating film 7a is disposed between the bias field applying layers 18 and each of the first shield layer 3, the conductive layer 31, the underlying layer 4 and the MR element 5, and provides insulation between these layers. The insulating film 7b is provided between the bias field applying layers 18 and the second shield layer 8 and provides insulation between these layers.

A method of manufacturing the magnetoresistive device of the second embodiment will now be described. According to the method, the first shield layer 3 having a specific pattern is first formed by plating, for example, on the insulating layer 2. Next, although not shown, an insulating layer of alumina, for example, is formed over the entire surface. Next, this insulating layer is polished by CMP, for example, so that the first shield layer 3 is exposed, and the top surfaces of the first shield layer 3 and the insulating layer are thereby flattened. Next, the conductive layer 31 is formed on the first shield layer 3 by plating or sputtering, for example. After that, the top surface of the conductive layer 31 is exposed to the atmosphere so that a thin oxide film is formed near the top surface of the conductive layer 31. Next, the oxide film formed near the top surface of the conductive layer 31 is removed by inverse sputtering (sputter-etching), for example. Next, the first layer 4a, the second layer 4b and the MR element 5 are sequentially formed on the conductive layer 31 by a single thin-film forming method, such as sputtering. Removal of the oxide film formed near the top surface of the conductive layer 31 and formation of the first layer 4a, the second layer 4b and the MR element 5 are performed in a vacuum without undergoing exposure to the atmosphere in the course of the process. Next, the conductive layer 32 is formed on the MR element 5 by plating or sputtering, for example.

Next, the conductive layer 31, the underlying layer 4, the MR element 5 and the conductive layer 32 are patterned by etching. Next, the insulating film 7a, the bias field applying layers 18 and the insulating film 7b are formed one by one by sputtering, for example. Next, the second shield layer 8 is formed by plating or sputtering, for example, on the conductive layer 32 and the insulating film 7b.

According to the second embodiment, the underlying layer 4 includes: the first layer 4a having the surfaces one of which (the bottom surface) is adjacent to the first shield layer 3 with the conductive layer 31 disposed in between; and the second layer 4b having the surfaces one of which (the bottom surface) is in contact with the other of the surfaces (the top surface) of the first layer 4a and the other of which (the top surface) is in contact with the MR element 5. The first layer 4a is made of a material including at least one of Ta, Ti, W, Hf and Y. The second layer 4b is made of a material including NiCr. As a result, the crystallinity and orientability of the films making up the MR element 5 are improved. The characteristics of the magnetoresisitve device are thereby improved.

The remainder of configuration, operation and effects of the second embodiment are similar to those of the first embodiment.

Third Embodiment

Figure 14:
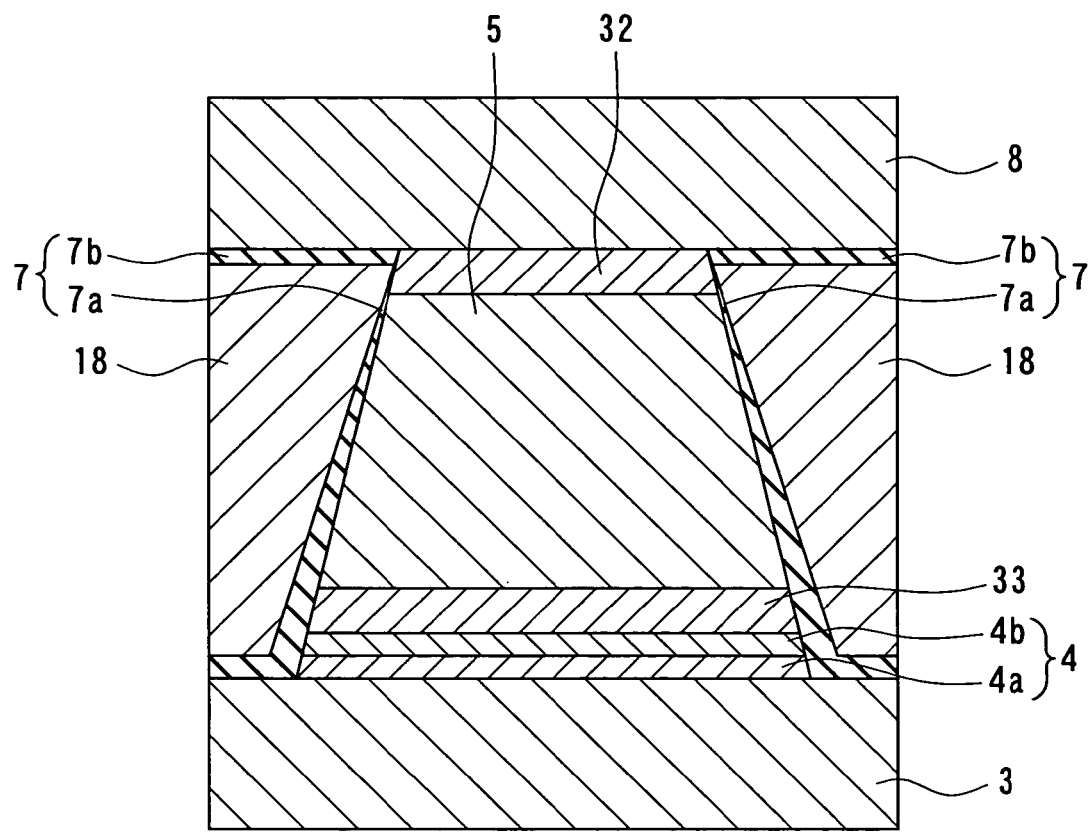
FIG. 14 is a cross-sectional view of a magnetoresistive device of a third embodiment of the invention, wherein the cross section is parallel to the air bearing surface.

Reference is now made to FIG. 14 to describe the configuration of a magnetoresistive device of a third embodiment of the invention. FIG. 14 is a cross-sectional view of the magnetoresistive device of the embodiment parallel to the air bearing surface. As the first embodiment, the magnetoresistive device of the third embodiment comprises: the first shield layer 3 and the second shield layer 8 disposed at a specific distance from each other; the MR element 5 disposed between the first shield layer 3 and the second shield layer 8; and the underlying layer 4 disposed between the first shield layer 3 and the MR element 5. The magnetoresistive device of the third embodiment further comprises: a conductive layer 33 disposed between the underlying layer 4 and the MR element 5; and the conductive layer 32 disposed between the MR element 5 and the second shield layer 8. The underlying layer 4, the conductive layer 33, the MR element 5, the conductive layer 32 and the second shield layer 8 are stacked on the first shield layer 3. The conductive layer 33 corresponds to the second conductive layer of the invention. The conductive layers 33 and 32 are used for feeding a sense current to the MR element 5. As the first embodiment, the MR element 5 is a spin-valve GMR element or a TMR element utilizing the tunnel magnetoresistive effect, for example.

As the first embodiment, the underlying layer 4 has the first layer 4a and the second layer 4b. According to the third embodiment, the bottom surface of the first layer 4a is in contact with the first shield layer 3. The bottom surface of the second layer 4b is in contact with the top surface of the first layer 4a. The top surface of the second layer 4b is adjacent to the MR element 5 with the conductive layer 33 disposed in between. Each of the first layer 4a and the second layer 4b is made of a material the same as that of the first embodiment.

As the magnetoresistive device of the first embodiment, the magnetoresistive device of the third embodiment further comprises: the two bias field applying layers 18 that are disposed adjacent to the two sides of the MR element 5 and apply a bias magnetic field to the MR element 5; and the insulating layer 7 disposed around the MR element 5 and the bias field applying layers 18. The insulating layer 7 incorporates the insulating films 7a and 7b. The insulating film 7a is disposed between the bias field applying layers 18 and each of the first shield layer 3, the underlying layer 4, the conductive layer 33 and the MR element 5, and provides insulation between these layers. The insulating film 7b is provided between the bias field applying layers 18 and the second shield layer 8 and provides insulation between these layers.

A method of manufacturing the magnetoresistive device of the third embodiment will now be described. According to the method, the first shield layer 3 having a specific pattern is first formed by plating, for example, on the insulating layer 2. Next, although not shown, an insulating layer of alumina, for example, is formed over the entire surface. Next, this insulating layer is polished by CMP, for example, so that the first shield layer 3 is exposed, and the top surfaces of the first shield layer 3 and the insulating layer are thereby flattened. At this time, since the top surface of the first shield layer 3 is exposed to the atmosphere, a thin oxide film is formed near the top surface of the first shield layer 3. Next, the oxide film formed near the top surface of the first shield layer 3 is removed by inverse sputtering (sputter-etching), for example. Next, the first layer 4a, the second layer 4b, the conductive layer 33 and the MR element 5 are sequentially formed on the first shield layer 3 by a single thin-film forming method, such as sputtering. Removal of the oxide film formed near the top surface of the first shield layer 3 and formation of the first layer 4a, the second layer 4b, the conductive layer 33 and the MR element 5 are performed in a vacuum without undergoing exposure to the atmosphere in the course of the process. Next, the conductive layer 32 is formed on the MR element 5 by plating or sputtering, for example.

Next, the underlying layer 4, the conductive layer 33, the MR element 5 and the conductive layer 32 are patterned by etching. Next, the insulating film 7a, the bias field applying layers 18 and the insulating film 7b are formed one by one by sputtering, for example. Next, the second shield layer 8 is formed by plating or sputtering, for example, on the conductive layer 32 and the insulating film 7b.

According to the third embodiment, the underlying layer 4 includes: the first layer 4a having the surfaces one of which (the bottom surface) is in contact with the first shield layer 3; and the second layer 4b having the surfaces one of which (the bottom surface) is in contact with the other of the surfaces (the top surface) of the first layer 4a and the other of which (the top surface) is adjacent to the MR element 5 with the conductive layer 33 disposed in between. The first layer 4a is made of a material including at least one of Ta, Ti, W, Hf and Y. The second layer 4b is made of a material including NiCr. As a result, the crystallinity and orientability of the conductive layer 33 formed on the underlying layer 4 are improved. The crystallinity and orientability of the films making up the MR element 5 formed on the conductive layer 33 are thereby improved, and the characteristics of the magnetoresisitve device are thereby improved.

The remainder of configuration, operation and effects of the third embodiment are similar to those of the first embodiment.

The present invention is not limited to the foregoing embodiments but may be practiced in still other ways. For example, in the foregoing embodiments, the thin-film magnetic head is disclosed, comprising the read head formed on the base body and the write head stacked on the read head. Alternatively, the read head may be stacked on the write head.

The thin-film magnetic head may have a configuration comprising the read head only if the thin-film magnetic head is intended for reading use only.

Obviously many modifications and variations of the present invention are possible in the light of the above teachings. It is therefore to be understood that within the scope of the appended claims the invention may be practiced otherwise than as specifically described.

What is claimed is:

1. A magnetoresistive device comprising:
    a first shield layer and a second shield layer disposed at a specific distance from each other;
    a magnetoresistive element disposed between the first shield layer and the second shield layer; and
    an underlying layer disposed between the first shield layer and the magnetoresistive element, wherein:
    the underlying layer, the magnetoresistive element and the second shield layer are stacked on the first shield layer;
    the underlying layer includes: a first layer having surfaces one of which is in contact with the first shield layer; and a second layer having surfaces one of which is in contact with the other of the surfaces of the first layer and the other of which is adjacent to the magnetoresistive element with a conductive layer disposed in between;
    the conductive layer is used for feeding the magnetoresistive element a current for detecting magnetic signals;
    the first layer is made of a material including at least one of Ta, Ti, W, Hf and Y; and
    the second layer is made of an alloy including Ni and Cr.

2. The magnetoresistive device according to claim 1, wherein the magnetoresistive element is a spin-valve giant magnetoresistive element.

3. The magnetoresistive device according to claim 1, wherein the magnetoresistive element is one utilizing a tunnel magnetoresistive effect.

4. A method of manufacturing a magnetoresistive device comprising:
    a first shield layer and a second shield layer disposed at a specific distance from each other;
    a magnetoresistive element disposed between the first shield layer and the second shield layer; and
    an underlying layer disposed between the first shield layer and the magnetoresistive element, wherein
    the underlying layer includes: a first layer having surfaces one of which is in contact with the first shield layer; and a second layer having surfaces one of which is in contact with the other of the surfaces of the first layer and the other of which is adjacent to the magnetoresistive element with a conductive layer disposed in between, and
    the conductive layer is used for feeding the magnetoresistive element a current for detecting magnetic signals,
    the method comprising the steps of:
    forming the first shield layer;
    forming the first layer of the underlying layer directly on the first shield layer;
    forming the second layer on the first layer;
    forming the magnetoresistive element over the second layer with the conductive layer disposed between the second layer and the magnetoresistive element; and
    forming the second shield layer on the magnetoresistive element, wherein:
    the first layer, the second layer, the conductive layer and the magnetoresistive element are sequentially formed by a single thin-film forming method;
    the first layer is made of a material including at least one of Ta, Ti, W, Hf and Y; and
    the second layer is made of an alloy including Ni and Cr.

5. The method according to claim 4, wherein the magnetoresistive element is a spin-valve giant magnetoresistive element.

6. The method according to claim 4, wherein the magnetoresistive element is one utilizing a tunnel magnetoresistive effect.

7. A thin-film magnetic head comprising: a medium facing surface that faces toward a recording medium; and a magnetoresistive device disposed near the medium facing surface to detect a signal magnetic field sent from the recording medium, the magnetoresistive device comprising:
    a first shield layer and a second shield layer disposed at a specific distance from each other;
    a magnetoresistive element disposed between the first shield layer and the second shield layer; and
    an underlying layer disposed between the first shield layer and the magnetoresistive element, wherein:
    the underlying layer, the magnetoresistive element and the second shield layer are stacked on the first shield layer;
    the underlying layer includes: a first layer having surfaces one of which is in contact with the first shield layer; and a second layer having surfaces one of which is in contact with the other of the surfaces of the first layer and the other of which is adjacent to the magnetoresistive element with a conductive layer disposed in between;
    the conductive layer is used for feeding the magnetoresistive element a current for detecting magnetic signals;
    the first layer is made of a material including at least one of Ta, Ti, W, Hf and Y; and
    the second layer is made of an alloy including Ni and Cr.

8. A head gimbal assembly comprising: a slider including a thin-film magnetic head and disposed to face toward a recording medium; and a suspension flexibly supporting the slider, wherein
    the thin-film magnetic head comprises: a medium facing surface that faces toward the recording medium; and a magnetoresistive device disposed near the medium facing surface to detect a signal magnetic field sent from the recording medium, the magnetoresistive device comprising:
    a first shield layer and a second shield layer disposed at a specific distance from each other;
    a magnetoresistive element disposed between the first shield layer and the second shield layer; and an underlying layer disposed between the first shield layer and the magnetoresistive element, wherein:

the underlying layer, the magnetoresistive element and the second shield layer are stacked on the first shield layer;

the underlying layer includes: a first layer having surfaces one of which is in contact with the first shield layer; and a second layer having surfaces one of which is in contact with the other of the surfaces of the first layer and the other of which is adjacent to the magnetoresistive element with a conductive layer disposed in between;

the conductive layer is used for feeding the magnetoresistive element a current for detecting magnetic signals;

the first layer is made of a material including at least one of Ta, Ti, W, Hf and Y; and the second layer is made of an alloy including Ni and Cr.

9. A hard disk drive comprising: a slider including a thin-film magnetic head and disposed to face toward a circular-plate-shaped recording medium that is rotated and driven; and an alignment device supporting the slider and aligning the slider with respect to the recording medium, wherein the thin-film magnetic head comprises: a medium facing surface that faces toward the recording medium; and a magnetoresistive device disposed near the medium facing surface to detect a signal magnetic field sent from the recording medium, the magnetoresistive device comprising:

a first shield layer and a second shield layer disposed at a specific distance from each other;

a magnetoresistive element disposed between the first shield layer and the second shield layer; and an underlying layer disposed between the first shield layer and the magnetoresistive element, wherein:

the underlying layer, the magnetoresistive element and the second shield layer are stacked on the first shield layer;

the underlying layer includes: a first layer having surfaces one of which is in contact with the first shield layer; and a second layer having surfaces one of which is in contact with the other of the surfaces of the first layer and the other of which is adjacent to the magnetoresistive element with a conductive layer disposed in between;

the conductive layer is used for feeding the magnetoresistive element a current for detecting magnetic signals;

the first layer is made of a material including at least one of Ta, Ti, W, Hf and Y; and the second layer is made of an alloy including Ni and Cr.

* * * * *